ALFRED W. NAGEL
INVENTOR.

BY Elmer P. Rucker

ATTORNEY

June 3, 1958
A. W. NAGEL
2,837,290
FEED MILL CHUTE WITH RECIPROCABLE KNIFE,
TO PREVENT PLUGGING OF MILL
Filed March 5, 1951
5 Sheets-Sheet 2
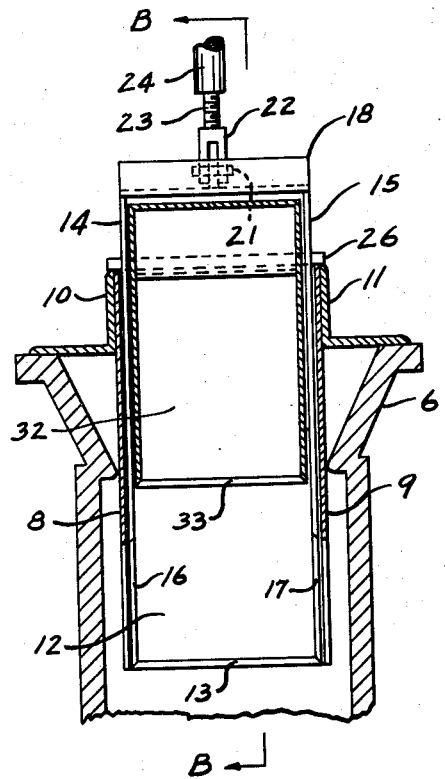
Fig. 3
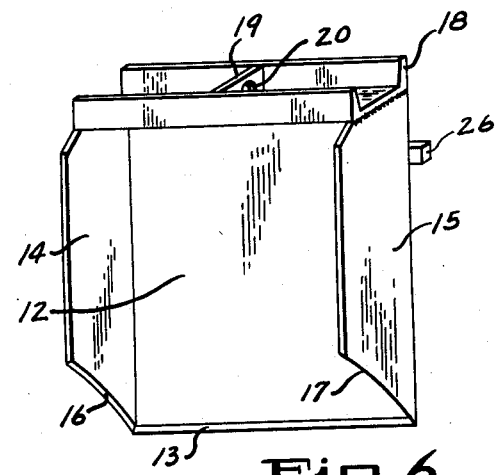
Fig. 5
Fig. 6
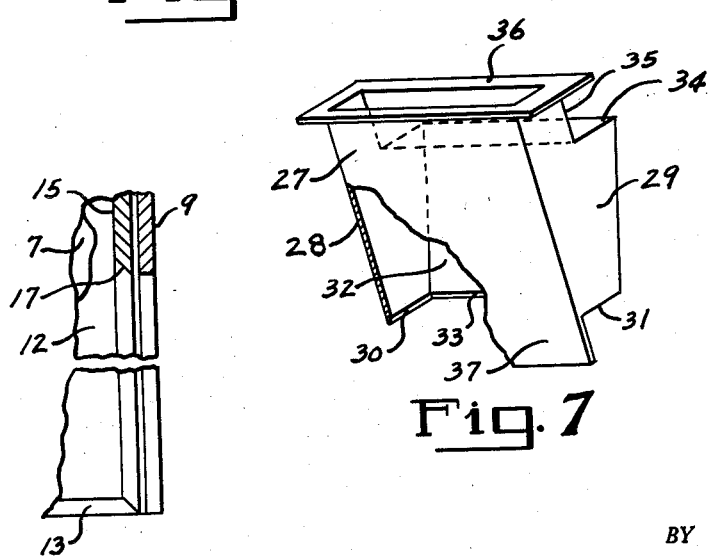
Fig. 4
Fig. 7
ALFRED W. NAGEL
INVENTOR.
BY Elmer P. Rucker
ATTORNEY INVENTOR.
ALFRED W. NAGEL
BY Elmer P. Rucker

ATTORNEY

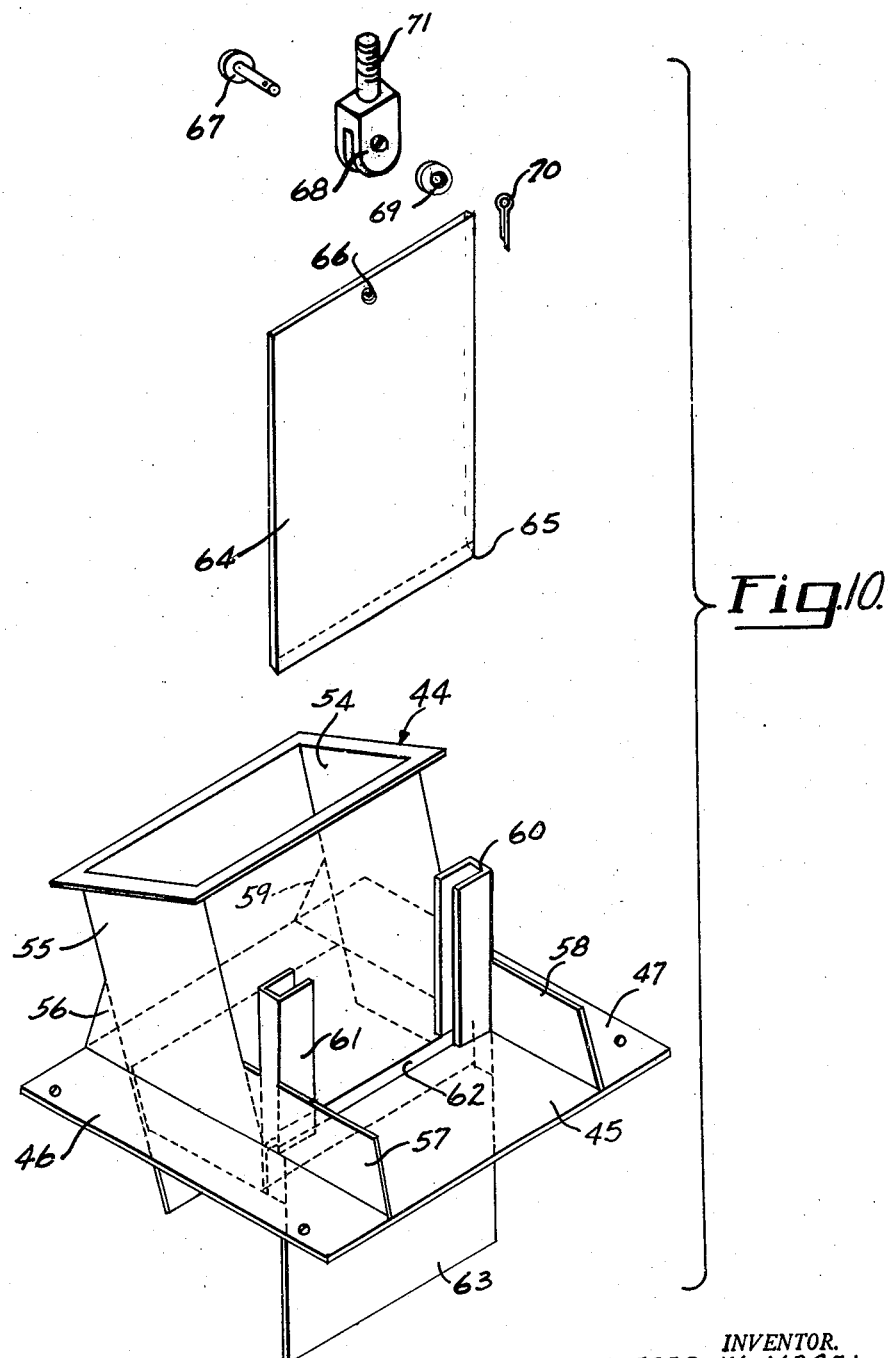

2,837,290

FEED MILL CHUTE WITH RECIPROCABLE KNIFE, TO PREVENT PLUGGING OF MILL

Alfred W. Nagel, Anniston, Ala., assignor to Monsanto Chemical Company, St. Louis, Mo., a corporation of Delaware Application March 5, 1951, Serial No. 213,977

5 Claims. (Cl. 241—186)

The present invention relates to improvements in hoppers for introducing semi-liquid, plastic, powdered or granular substances into shipping and storage containers and also into mills of various types.

An object of the invention is to provide a novel device for feeding materials comprising, in combination, a feed chute and a reciprocating knife which coacts with the discharge end of the chute to prevent build up of materials on the knife, and the ultimate plugging up of the outlet of the chute.

An object of the invention is to provide a device for feeding materials comprising, in combination, a feed chute, a casing against which the feed from the chute discharges and a reciprocating knife located between the chute and the casing, which coacts with the discharge end of the chute and the inner surface of the casing to prevent plugging of the chute.

A further object of the invention is to provide in combination with mills including a rotary grinding means, a device for feeding materials thereto comprising a feed chute having an elongated extension which provides a baffle preventing impingement on the inner surface of the chute by material picked up and thrown by the rotary grinding means.

A still further object of the invention is to provide in combination with grinding, mixing and similar mills, material feeding devices of the above described type.

Other objects and advantages of the invention will become apparent to those skilled in the art as the present description unfolds.

With the above and other objects in view the invention comprises certain novel details of construction and combination of parts hereinafter fully described and claimed, it being understood that various modifications may be resorted to within the scope of the appended claims without departing from the spirit or sacrificing any of the advantages of the invention.

In the accompanying drawings which form a part of this specification,

Figure 3 is a vertical sectional view of Figure 1 taken on line A—A.

Figure 4 is a fragmentary vertical sectional view of the lower extremities of the fixed and reciprocating knives.

Figure 5 is an elevational view of the outer casing which serves as a false back for the chute.

Figure 6 is an elevational view of the reciprocating knife used to remove material adhering to the outer casing.

Figure 7 is an elevational view of the combined feed chute and fixed knife which removes material adhering to the reciprocating knife.

Figure 10 is an elevational view showing the order of assembly of or the relationship between the knife blade support, the knife blade, the knife guide and the feed chute.

Figure 2:
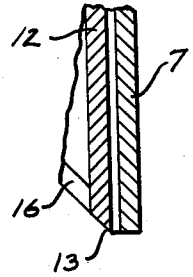
Figure 2 is a fragmentary vertical sectional view of the reciprocating knife and the adjacent outer casing.

Referring more particularly to Figures 1–7, inclusive, of the above drawings, reference character 1 designates the housing of a milling machine. This housing encloses a screen 2 and a rotor consisting of a series of discs 3 mounted upon a drive-shaft 4 and a plurality of circumferentially spaced hammers 5 which coact with the screen to effect grinding.

The housing 1 has a hopper section 6 which supports an outer casing (Figure 5) composed of a plate 7, sidewalls 8 and 9 and angle irons 10 and 11 which are rigidly secured by welding or another suitable means to sidewalls 8 and 9 respectively. The plate 7 of the outer casing extends down into the housing 1 to a point as close to the screen as the mill construction permits; this plate serves as the impingement area for the material thrown by the hammers when the reciprocating knife is in an elevated position.

The reciprocating knife (Figure 6) is composed of a plate 12 having a knife edge 13 and sidewalls 14 and 15 which are provided at their lower extremities with curved knife edges 16 and 17 respectively. The plate and side walls of the knife are welded at their upper ends to a channel iron 18. This channel iron (or other rigid frame) is equipped with a cross piece 19 having an opening 20 which connects the reciprocating knife to a source of power (not shown) by means of stud 21, bracket 22, bolt 23, operating rod 24 and a two-way cylinder 25, the bolt 23 being threaded so that the stroke of the reciprocating knife can be adjusted as required.

The reciprocating knife travels within the confines of the sidewalls 8 and 9 of the outer casing and at the downward limit of its motion, its knife edge 13 registers with or closely approximates the lower extremity of plate 7 of the outer casing. The downward travel of the knife is controlled by the adjusting bolt 23 and also by the detent 26 which is welded to the back 12 of the reciprocating knife. The upward travel of the reciprocating knife is likewise regulated by the adjusting bolt 23, the upper limit being indicated by the dotted line position shown in Figure 1.

The combined feed chute and fixed knife is of the configuration shown in Figure 7 and comprises an elongated front wall 27, side walls 28 and 29 having knife edges 30 and 31 respectively and a rear wall 32 with a knife edge 33, the back wall being continued in two different planes so as to provide sections 34 and 35 respectively. All of the foregoing walls terminate in a single continuous flange 36.

The combined feed chute and fixed knife may be formed in a single unit or the several parts may be rigidly secured together by welding or in any other suitable manner.

Figure 1:
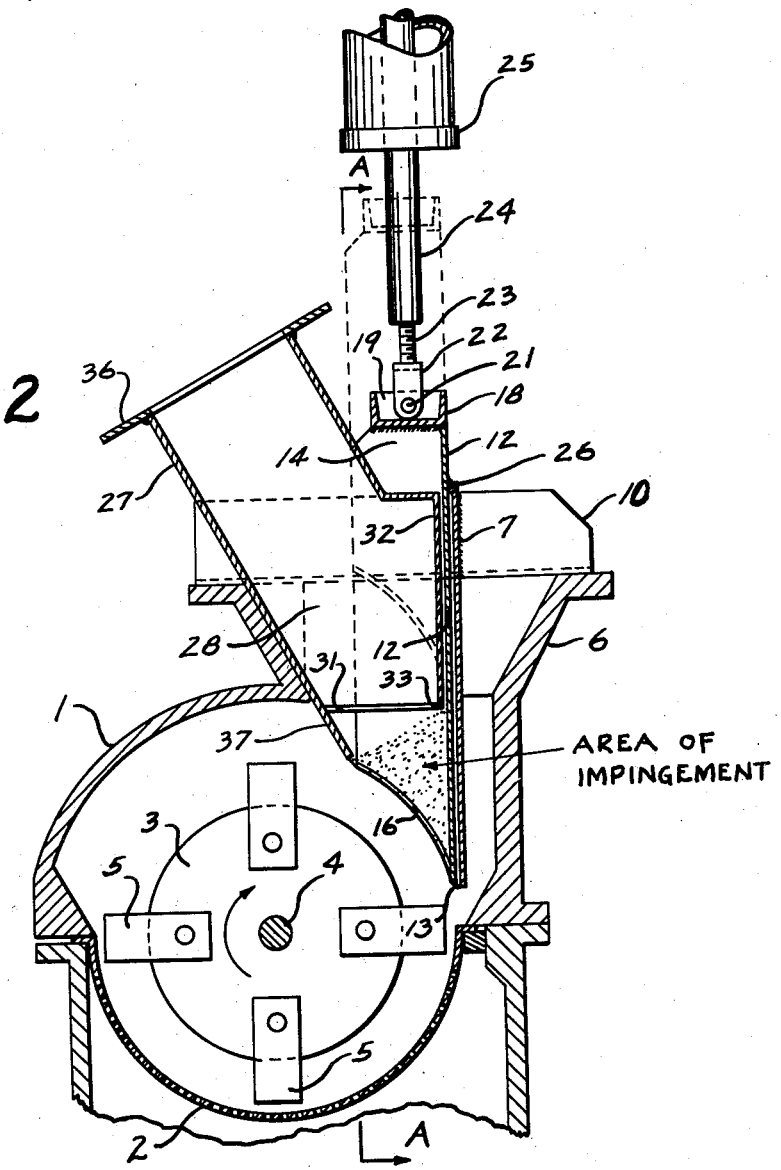
Figure 1 is a vertical sectional view of a preferred embodiment of the present invention, the section being taken on line B—B of Figure 3.

The foregoing unit is rigidly mounted in the hopper section 6 of the mill in the position indicated in Figures 1 and 2. This unit is secured to the flange on the hopper section 6 by means of bolts (not shown). It is obvious from the above figures that the posterior portion of the unit is mounted within the confines of the side walls 14 and 15 of the reciprocating knife but is spaced therefrom a sufficient distance to allow free movement of the knife. Moreover, it is evident that the bottom portion of the front wall 27 extends a substantial distance below the housing 1 to provide a baffle 37 which prevents material thrown by the hammers 5 from impinging on the inner surface of the fixed knife and thereby aids in preventing the clogging of the feed chute.

In the operation of the above device, the rotor is rapidly rotated and the material to be treated is continuously introduced into the combined feed chute and fixed knife. The material entering the chute is conveyed by gravity onto the screen where it is subjected to the action of the hammers and thereby reduced to a state of sub-division permitting its passage through the screen.

During the above operation, the reciprocating knife is continuously or intermittently reciprocated depending upon the nature of the material being treated. For example, if the material tends to build up slowly, one knife movement every 15 or 30 minutes may be sufficient to prevent plugging of the feed chute. On the other hand, if the material tends to build up rapidly, a knife movement every 10 or 15 seconds or a shorter period of time may be required.

The movement of the reciprocating knife is controlled by a simple electric timer, the construction of which is not shown as any conventional timing device may be employed.

The baffle 37 is located in such a position that the lower edge of the fixed knife is above the point of impingement of the material picked up and thrown by the hammers. This type of arrangement prevents build up of material on the inner surfaces of the fixed knife which, if not prevented, would plug up the mill feed chute.

The area of impingement is substantially as indicated in Figure 1 of the accompanying drawings. Thus, it is evident that this area is on the reciprocating knife when in its lowered position and on the outer casing when the knife is in its elevated position. In either case, the material is removed when the knife moves up and down. For example, the material impinged on the reciprocating knife is removed in its upward movement by the knife edges 30, 31 and 33, whereas the material which collects on the outer casing is removed by the knife edges 13, 16 and 17 of the reciprocating knife as it moves downwardly.

While the above described embodiment of the invention is the preferred one, it may be further simplified and still provide an operative device. For example, the casing 7 may take the form of a simple stationary plate or it may be omitted altogether, but when the latter is done, it is desirable that suitable guides be provided for the reciprocating knife. Moreover, the baffle 37 may be eliminated and still provide an efficiently operating device by shortening the feed chute to a point above the line of impingement, and increasing the length of the stroke of the reciprocating knife sufficiently to effect a removal by means of the fixed knife of the material deposited on the inner surface of the reciprocating knife. Furthermore, although the feed chute has been shown to be rectangular in cross section, it is obvious that this is not a critical factor as any other configuration may be employed. Also, in addition to being simply a flat plate, the reciprocating knife may have a configuration permitting it to embrace the feed chute in whatever form it may take.

Figure 8:
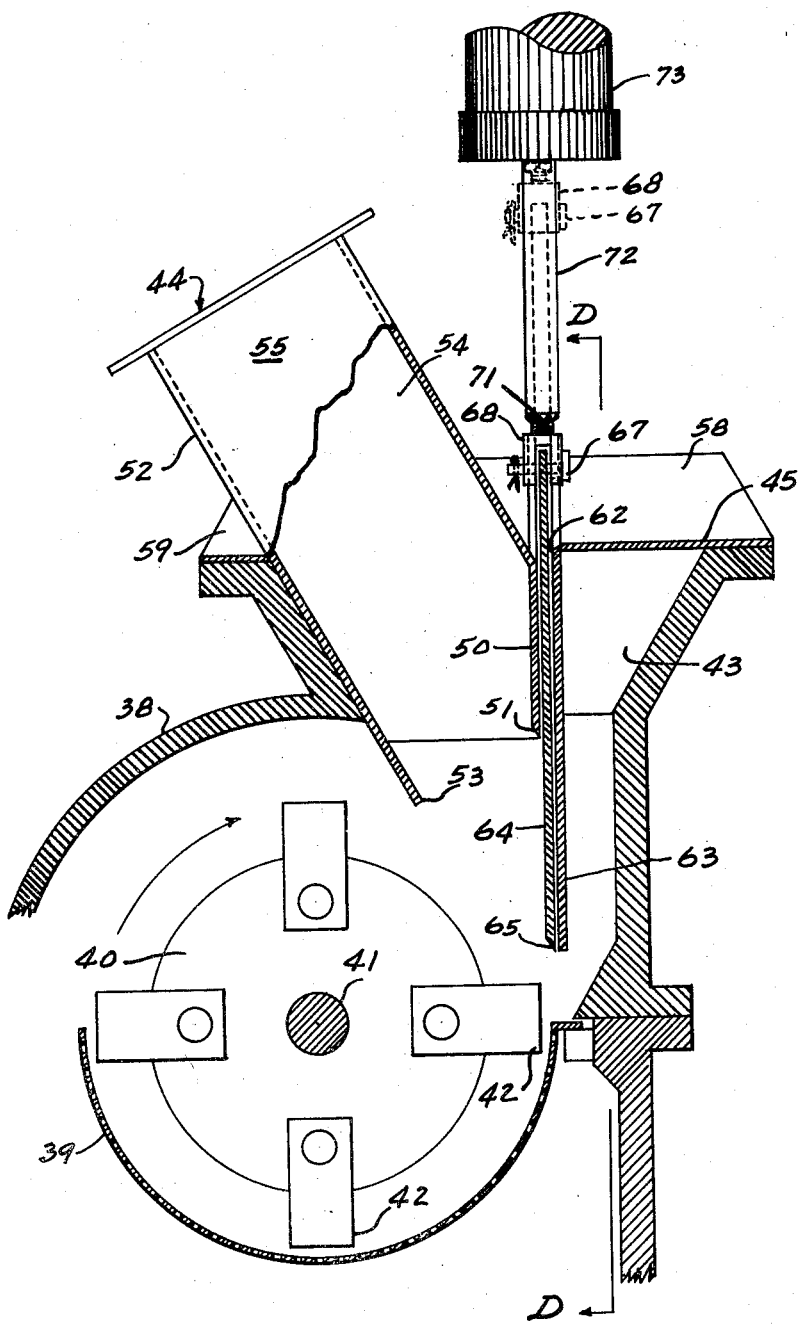
Figure 8 is a vertical sectional view of another embodiment of the present invention, the section being taken on line C—C of Figure 9.
Figure 9:
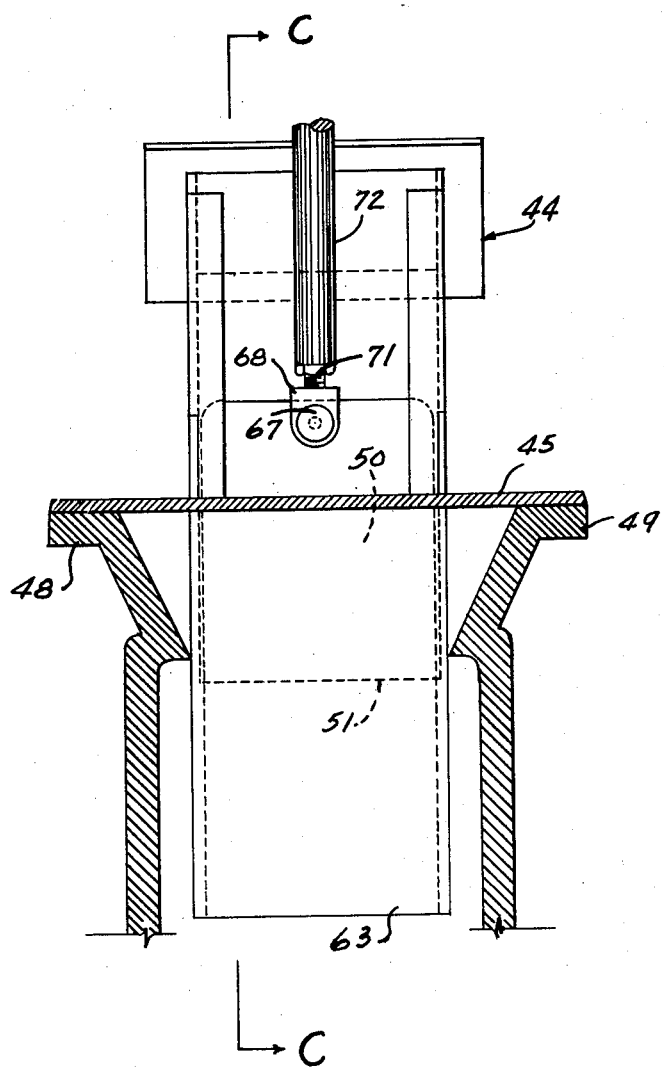
Figure 9 is a vertical sectional view of Figure 8 taken on line D—D.

Referring to Figures 8–10, inclusive, of the drawings, illustrating a simplified form of the invention described above, reference character 38 represents the housing of a milling machine. This housing encloses a screen 39 and a rotor including a series of discs 40 mounted upon a drive shaft 41 and a plurality of circumferentially spaced hammers 42 which coact with the screen to effect grinding.

The housing 38 is provided with a hopper section 43 in which the feed chute 44 is rigidly mounted, the chute being fixedly carried in a perforated rectangular plate 45 having flanges 46 and 47 by which it is secured to flanges 48 and 49, respectively, of the hopper section 43. The rear vertical wall 50 of the feed chute 44 terminates in a knife edge 51 and the front wall 52 thereof is provided with an elongated extension 53 which extends a substantial distance below the housing 38. This extension serves as a baffle preventing material thrown by the hammers 42 from impinging on the inner surface of the vertical rear wall 50 and thereby aids in preventing the clogging of the feed chute 44.

The feed chute 44 is provided with side walls 54 and 55 having lateral extensions 56, 57 and 58, 59, respectively, all of which are welded or otherwise rigidly secured to the rectangular plate 45. Spaced from the rear wall 50 of the feed chute, there is provided two U-shaped knife guides 60 and 61 which are welded or otherwise rigidly attached to the lateral extensions 57 and 58, respectively, and plate 45. These knife guides extend down to and register with the extremities of the knife opening 62 in plate 45. Beneath the plate 45 and substantially parallel to the rear wall 50 of the feed chute, there is provided a plate 63 which extends down into the housing to a point as close to the hammers 42 and the screen 39 as the mill construction permits. The plate 63 is rigidly secured to the bottom surface of plate 45 by welding or any other suitable means and serves as the impingement area for the material thrown by the hammers 42 when the reciprocating knife is in an elevated position.

The reciprocating knife is composed of a flat plate 64 which is provided at its lower extremity with a knife edge 65 and at a center point adjacent to its upper extremity with a perforation 66 by which the knife is connected to a source of power (not shown) by any suitable means such as a pin 67, clevis 68, washer 69, cotter pin 70, bolt 71, operating rod 72 and a two-way cylinder 73, the bolt being threaded so that the stroke of the knife can be adjusted as required.

The reciprocating knife 64 travels within the confines of the knife guides 60 and 61 and with slidable clearance between the vertical wall 50 of the feed chute 44 and plate 63. At the downward limit of its motion, the knife edge 65 of the knife 64 registers with or closely approximates the lower extremity of plate 63. The downward and upward travel of the knife is controlled by the adjusting bolt 71 and the stroke of the power device, the upper limit being indicated by the dotted line position shown in Figure 8.

The operation of the device shown in Figures 8–10, inclusive, is essentially the same as that described in connection with Figures 1–7, inclusive. For example, it will be observed from an inspection of the drawings that the impingement area is on the lower end of plate 63 when the reciprocating knife 64 is in its elevated position and on the reciprocating knife 64 in its lowered position. In either case, the material is removed from the impingement area when the knife reciprocates. Thus, the material impinged on the knife is removed in its upward movement by knife edge 51, whereas the material which collects on plate 63 is removed by knife edge 65 of the reciprocating knife as it moves downwardly.

The device for feeding materials described in Figures 1–10, inclusive, is flexible in its operation and can be applied to any type of mill. In addition, it is applicable to any situation in which the problem of plugging is encountered in feeding semi-liquid, plastic, powdered or granular substances. For example, in addition to its use with mills generally, it is applicable where it is desired to intermittently or continuously feed material of the above type into storage bins, storage receptacles, shipping containers, railroad cars, etc. Finally, it is also applicable to the prevention of plugging of material handling chutes, ducts and spouts at points of change of direction of the feed.

The improvements herein set forth are not limited to the precise construction and arrangement shown and described since they may be embodied in various forms and modifications without departing from the spirit and scope of the invention.

What I claim is:

1. In combination with a mill including a rotary grinding means, a device for feeding materials thereto comprising a feed chute terminating in a knife edge; a stationary plate, against which the feed from said chute directly discharges and against which a portion of the material being ground is directly projected on rotation of said rotary grinding means in the direction of said plate; a reciprocable knife located with running clearance between said chute and said plate, which at least reciprocates the distance defined by the lower end of said plate and the knife edge of said chute and prevents buildup of material on said knife and said plate by coaction on its upward movement with the knife edge of said chute and on its downward movement with the adjacent surface of said plate; and means for reciprocating said knife, said feed chute being located above the axis of said rotary grinding means and at an angle permitting gravity flow of materials therethrough, said reciprocable knife and said stationary plate being of similar cross section, and said knife edge of said feed chute being located adjacent to said stationary plate and above the line of impingement of said rotor projected material.

2. In combination with a mill including a rotary grinding means, a device for feeding materials thereto comprising a feed chute provided with a knife edge at its lower extremity; a casing adjacent to said chute, which extends below the outlet thereof and provides an impingement area against which a portion of the material being ground is directly projected on rotation of said rotary grinding means in the direction of said casing; a reciprocable knife located with running clearance between said chute and said casing, which at least reciprocates the distance defined by the lower end of said casing and the bottom edge of said chute adjacent to said casing and prevents buildup of material on said knife and said casing by coaction on its upward movement with the knife edge of said chute and on its downward movement with the adjacent surface of said casing; and means for reciprocating said knife, said feed chute being located above the axis of said rotary grinding means and at an angle permitting gravity flow of materials therethrough, said chute, said reciprocable knife and said casing being of substantially the same cross section and said knife edge of said feed chute being substantially coextensive with the adjacent surface of said reciprocable knife and being located above the line of impingement of said rotor projected material.

3. In combination with a mill including a rotary grinding means, a device for feeding materials thereto comprising a feed chute of substantially rectangular cross section having rear and side walls terminating in knife edges and a front wall provided with an elongated extension on its bottom end; a casing embracing the rear and side walls of said feed chute, against which the feed from said chute discharges and against which a portion of the material being ground is projected on rotation of said rotary grinding means in the direction of said casing; a reciprocable knife located with running clearance between said chute and said casing, which embraces the rear and side walls of said chute and reciprocates at least the distance defined by the lower end of said casing and the bottom edge of the rear wall of said chute and prevents buildup of material on said knife and said casing by coaction on its upward movement with the knife edges of said chute and on its downward movement with the adacent surfaces of said casing; and means for reciprocating said knife, said elongated extension of said front wall being located transversely with respect to the path of the material thrown from said rotary grinding means so as to serve as a baffle preventing impingement of said ground material on said rear and side walls of said chute and said feed chute being located above the axis of said rotary grinding means and at an angle permitting gravity flow of materials therethrough.

4. In combination with a mill including a rotary grinding means, a device for feeding materials thereto comprising a substantially vertical feed chute of substantially rectangular cross section having rear and side walls terminating in knife edges and a front wall provided with an elongated extension on its bottom end; a casing embracing the rear and side walls of said feed chute, against which the feed from said chute discharges and against which a portion of the material being ground is projected on rotation of said rotary grinding means in the direction of said casing; a substantially vertically reciprocable knife located with running clearance between said chute and said casing, which embraces the rear and side walls of said chute and reciprocates at least the distance defined by the lower end of said casing and the bottom edge of the rear wall of said chute and prevents buildup of material on said knife and said casing by coaction on its upward movement with the knife edges of said chute and on its downward movement with the adjacent surfaces of said casing; and means for reciprocating said knife, said elongated extension of said front wall being located transversely with respect to the path of the material thrown from said rotary grinding means so as to serve as a baffle preventing impingement of said ground material on said rear and side walls of said chute.

5. In combination with a mill including a rotary grinding means, a device for feeding materials thereto comprising a feed chute having a front wall provided with an elongated extension and a rear wall terminating in a knife edge; a stationary plate against which the feed from said chute discharges and against which a portion of the material being ground is projected on rotation of said rotary grinding means in the direction of said plate; a reciprocable knife located with running clearance between said chute and said plate, which at least reciprocates the distance defined by the lower end of said plate and the knife edge of said chute and prevents build up of material on said knife and said plate by coaction on its upward movement with the knife edge of said chute and on its downward movement with the adjacent surface of said plate; and means for reciprocating said knife, said elongated extension of said front wall being located transversely with respect to the path of material thrown from said rotary grinding means so as to serve as a baffle preventing impingement of said ground material on said rear wall of said chute, said feed chute being located above the axis of said rotary grinding means and at an angle permitting gravity flow of materials therethrough, said reciprocable knife and said stationary plate being of similar cross section and said knife edge of said chute being located adjacent to said stationary plate.

References Cited in the file of this patent

UNITED STATES PATENTS

| Re. 13,820 | Kinsey | Oct. 27, 1914 |
| 677,795 | Pratt | July 2, 1901 |
| 1,158,259 | Michaelson | Oct. 26, 1915 |
| 1,359,215 | Williams | Nov. 16, 1920 |
| 1,643,938 | Addicks | Oct. 4, 1927 |
| 2,019,926 | Noble | Nov. 5, 1935 |
| 2,574,948 | Alikonis | Nov. 13, 1951 |

FOREIGN PATENTS

| 425,795 | Great Britain | Mar. 11, 1935 |